United States Patent [19]
Branch et al.

[11] Patent Number: 5,881,833
[45] Date of Patent: Mar. 16, 1999

[54] MOTORCYCLE THROTTLE ROLLOFF SWITCH

[75] Inventors: Matthew G. Branch, Hartford; Matthew F. Planning, Milwaukee, both of Wis.

[73] Assignee: Harley-Davidson Motor Company, Milwaukee, Wis.

[21] Appl. No.: 802,143

[22] Filed: Feb. 19, 1997

[51] Int. Cl.⁶ .................................................. B60K 31/00
[52] U.S. Cl. ............................ 180/179; 180/219; 74/625
[58] Field of Search ................................. 180/179, 170, 180/178, 219; 74/625; 23/360, 350, 352, 378

[56] References Cited

U.S. PATENT DOCUMENTS

| | | | |
|---|---|---|---|
| 3,982,446 | 9/1976 | Van Dyken | 74/488 |
| 4,137,793 | 2/1979 | Sowell | 74/488 |
| 4,364,283 | 12/1982 | Ricardo | 74/489 |
| 4,513,836 | 4/1985 | Treadwell | 180/177 |
| 4,524,843 | 6/1985 | Class et al. | 180/179 |
| 4,569,239 | 2/1986 | Shirley et al. | 74/89 |
| 4,580,537 | 4/1986 | Uchiyama | 123/352 |
| 4,610,230 | 9/1986 | Saito et al. | 123/360 |
| 4,884,649 | 12/1989 | Onishi et al. | 180/179 |
| 4,969,531 | 11/1990 | Hirakata et al. | 180/179 |
| 5,319,557 | 6/1994 | Juman | 364/426 |

OTHER PUBLICATIONS

Clare, Reed Switch Specification.
Nascom, inc., Security Switches You Can Depend On.

Primary Examiner—Peter C. English
Assistant Examiner—Bridget Avery
Attorney, Agent, or Firm—Michael, Best & Friedrich LLP

[57] ABSTRACT

A motorcycle having a throttle rolloff switch that is operatively associated with the throttle control and the cruise control device to deactivate the cruise control device when the throttle control is rotated to reduce the speed of the motorcycle. The rolloff switch includes a magnetically-sensitive sensor, a magnet positioned in spaced relation to the sensor and movable relative to the sensor, and a coil spring positioned between the sensor and the magnet so that the sensor and the magnet are normally biased in separated relation.

9 Claims, 3 Drawing Sheets

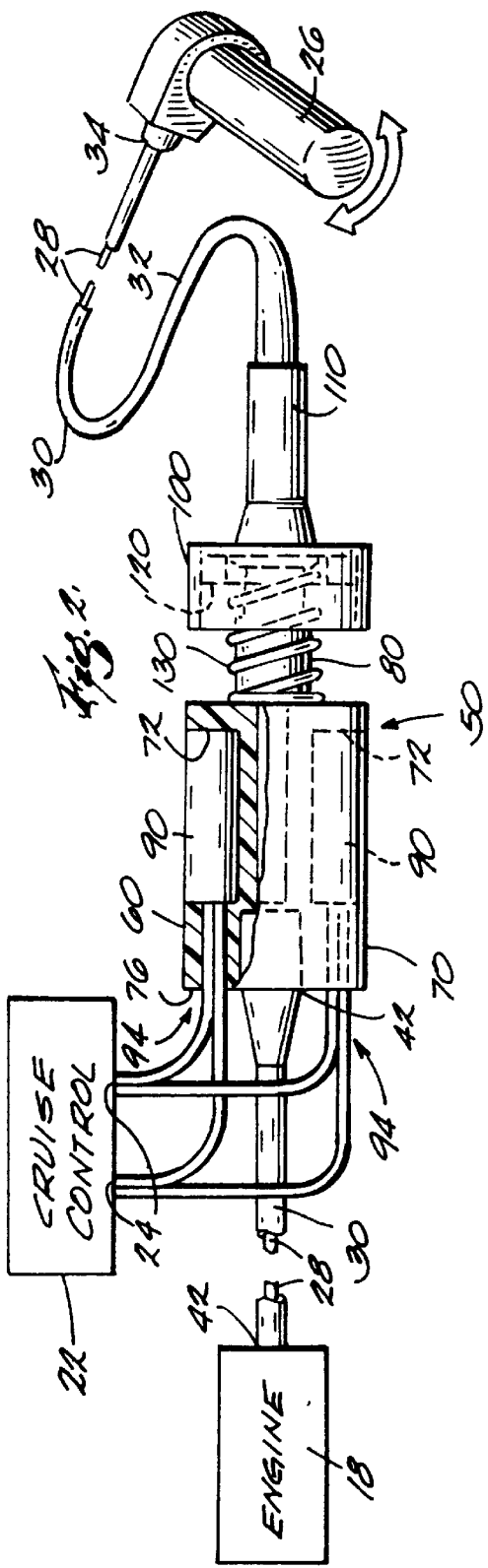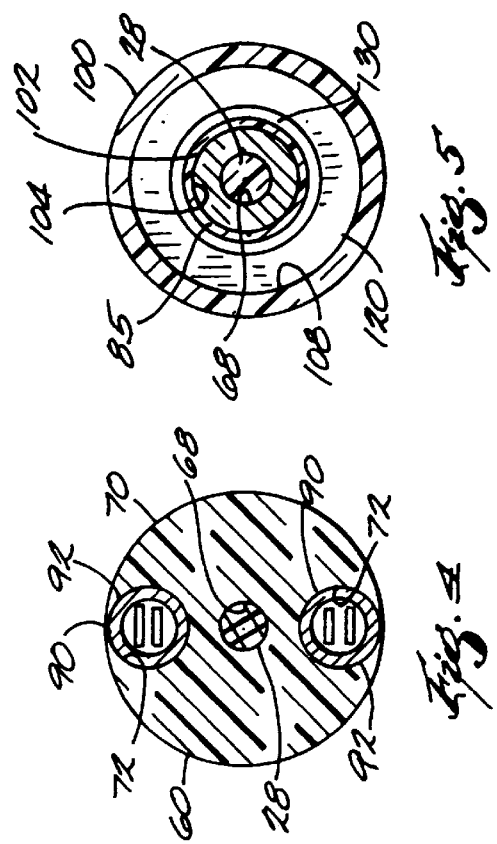

MOTORCYCLE THROTTLE ROLLOFF SWITCH

BACKGROUND OF THE INVENTION

The present invention generally relates to motorcycle cruise control devices and, more particularly, to throttle rolloff switches for disengaging such cruise control devices.

Cruise control devices for motorcycles are well known. Typically, an operator sets the cruise control device so that the speed of the motorcycle is maintained without the operator applying constant pressure to the throttle handgrip. The operator controls the cruise control device through numerous selectors, including switches that turn the cruise control device on or off and that engage or disengage the cruise control device at a desired setting.

When the cruise control device is "off", the device cannot be engaged and, therefore, cannot be used to control the speed of the motorcycle. When the cruise control device in "on", the device can be engaged to control the motorcycle speed, or the device can be disengaged so that the device does not control the motorcycle speed. Once a cruise control device is moved from the engaged condition to the disengaged condition, the device can be re-engaged at the previous speed setting or engaged at a new setting.

The cruise control device may be automatically disengaged by the operation of a throttle rolloff switch. Throttle rolloff switches are operated by rotation of the handgrip to decrease the throttle (i.e., reduce engine power output). One type of rolloff switch includes a pair of electrically-charged contact plates separated by a piece of compressible insulating foam. The switch is positioned within a gap in the throttle conduit such that compression of the conduit will result in compression of the foam, thereby forcing the contact plates closer together.

In operation, when the cruise control device is engaged and the throttle handgrip is rotated to decrease the throttle, the throttle cable is placed under tension, and the conduit surrounding the cable is placed under compression. The compression of the conduit causes compression of the rolloff switch and moves the plates closer together. When the plates make physical contact, a signal is generated to disengage the cruise control device. When the compression on the conduit is released (i.e., when the handgrip is no longer rotated to decrease the throttle), the foam insulation expands and moves the plates apart. The signal is stopped, and the cruise control device can be engaged or re-engaged.

SUMMARY OF THE INVENTION

Some throttle rolloff switches, as described above, have several problems. For example, without the usage of environmentally sealed switches, the contact plates may corrode and oxidize as a result of atmospheric contamination. Additionally, the compressible foam insulation, which provides a means of compressive resistance, can lose its resilience and flatten out over time. Permanent deformation of the foam can result in an increased effort being required to operate the throttle control and can also result in the cruise control device being permanently disengaged by the close proximity of the contact plates.

The present invention provides an improved throttle rolloff switch that attempts to alleviate the problems relating to existing throttle rolloff switches. In one aspect, the invention provides a motorcycle comprising an engine capable of operating at a speed, a throttle control operatively associated with the engine and moveable in a first direction to increase the speed of the engine and in a second direction to decrease the speed of the engine, a cruise control device operatively associated with the engine and capable of maintaining the speed of the motorcycle substantially constant, and a throttle rolloff switch. The throttle rolloff switch includes a magnetically-sensitive sensor (e.g., a plurality of reed switches) and a magnet. The magnet is positioned in spaced relation to the magnetically-sensitive sensor and is moveable relative to the magnetically-sensitive sensor. Movement of the throttle control in the second direction when the cruise control device is activated causes movement of the magnet relative to the sensor.

The throttle control preferably includes a throttle cable and a conduit surrounding a portion of the cable and engaging the throttle rolloff switch. Movement of the throttle cable in the second direction when the cruise control is activated creates tension in the throttle cable and compression in the conduit to thereby move the magnet towards the sensor.

The throttle rolloff switch can include a generally cylindrical housing having an axis. The housing surrounds the sensors and maintains the sensors in spaced relation on opposing sides of the axis. Preferably, the sensors are hermetically-sealed, thus reducing the potential problem of atmosphere-induced oxidation or corrosion. The throttle rolloff switch can include an annular retainer defining a recess. The magnet is positioned within the recess and is preferably annular.

In another aspect, the invention provides a motorcycle comprising an engine, a throttle control, a cruise control device, and a throttle rolloff switch operatively associated with the throttle control and the cruise control device. The throttle rolloff switch includes a first member, a second member moveable relative to the first member and including a sensor for sensing the position of the first member relative to the second member, and a coil spring biasing the second member relative to the first member. The steel compression spring provides a better means of compressive resistance than does compressible foam insulation. In this regard, stops are provided that prevent excessive deformation of the spring by keeping it within the specified range of operation. The use of the compression spring reduces any necessary increase in effort at the throttle control over time. The use of the compression spring also reduces the likelihood that the cruise control device will be permanently disengaged by permanent deformation of the means of compressive resistance.

The first member can include a magnet and the sensor can be a magnetically-sensitive switch. The throttle rolloff switch can include a stop engageable with the first member to limit the movement of the first member relative to the second member to prevent excessive deformation of the spring.

Other features and advantages of the invention will become apparent to those skilled in the art upon review of the following detailed description, claims and drawings.

DESCRIPTION OF THE DRAWING

FIG. 2 is a schematic partial cross-sectional view of a throttle rolloff switch.

FIG. 4 is a cross-sectional view taken along line 4—4 in FIG. 3.

FIG. 5 is a cross-sectional view taken along line 5—5 in FIG. 3.

DETAILED DESCRIPTION OF THE PREFERRED EMBODIMENT

Figure 1:
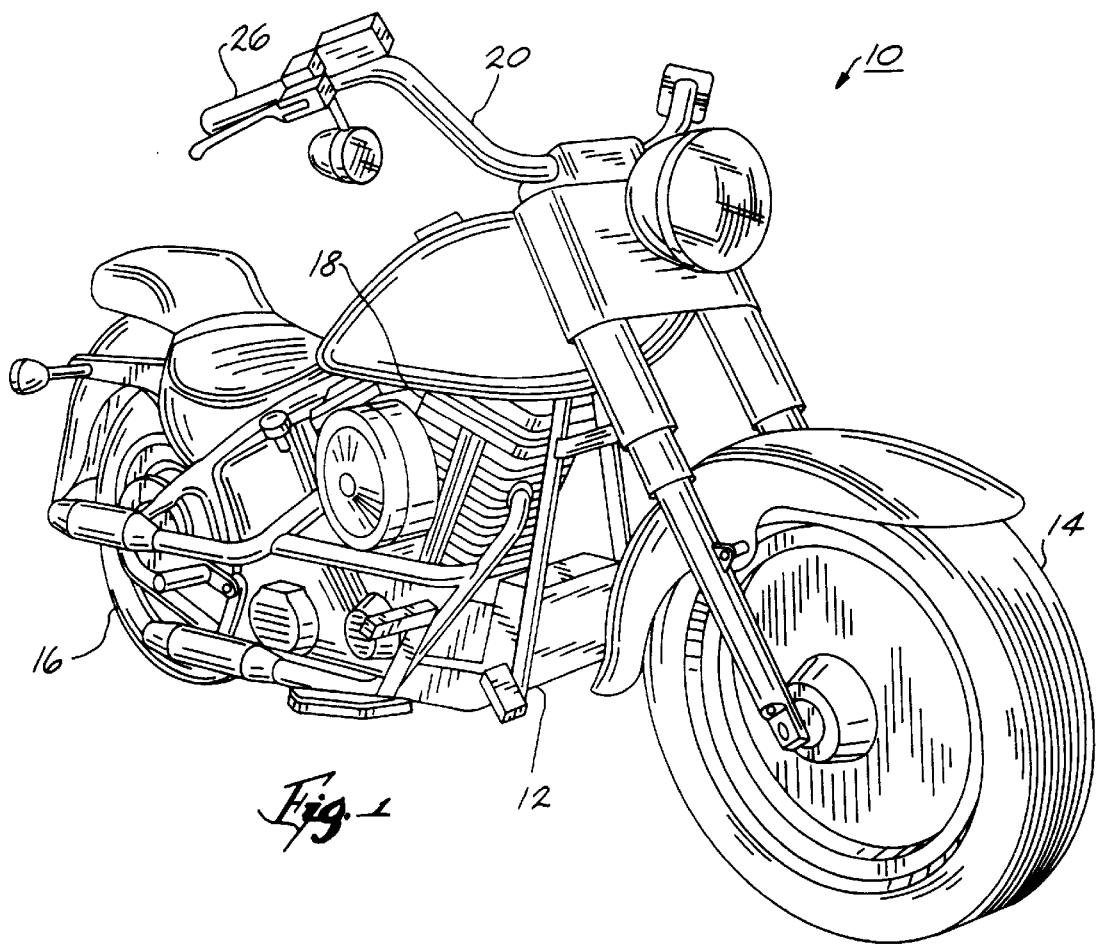
FIG. 1 is a perspective view of a motorcycle embodying the invention.

FIG. 1 illustrates a motorcycle 10 embodying the present invention. The motorcycle 10 includes a frame 12 supported by a front wheel 14 and a rear wheel 16. The motorcycle 10 also includes an engine 18 which, in the present embodiment, is a gasoline-powered, internal combustion engine. The motorcycle 10 also includes a drive system (not shown) for engaging the engine 18 to selectively drive the rear wheel 16 so that the motorcycle 10 can be operated at a speed. The motorcycle 10 also includes a steering system including a handlebar 20 connected to the front wheel 14. The foregoing elements are well known in the art and, therefore, need not be described in detail.

As shown in FIG. 2, the motorcycle 10 also includes a cruise control device 22 having a pair of connections 24. The cruise control device 22 is operable to maintain the speed of the motorcycle 10 substantially constant when the cruise control device 22 is on and engaged.

As shown in FIG. 1, a throttle handgrip 26 is rotatably supported on the handlebar 20. Referring to FIG. 2, a throttle cable 28 and a corresponding throttle conduit 30 are operatively connected to the handgrip 26 and control the throttle position of the engine 18 and, indirectly, the speed of the motorcycle 10. As viewed in FIG. 2, from the end of the handgrip 26, rotation of the handgrip 26 in the counterclockwise direction will increase the throttle of the engine 18 and rotation of the handgrip 26 in the clockwise direction will decrease the throttle of the engine 18.

One end of the cable 28 is connected to the handgrip 26, and the other end of the cable 28 is connected to the engine 18 in a conventional manner.

The conduit 30 includes a first conduit portion 32 having a first end 34 adjacent the handgrip 26 and a second end 36. The conduit 30 also includes a second conduit portion 38 having a first end 40 and a second end 42 adjacent the engine 18. The second end 36 of the first conduit portion 32 and the first end 40 of the second conduit portion 38 are in proximity to an intermediate portion of the cable 28.

The motorcycle 10 further includes a throttle rolloff switch 50 supported proximate the intermediate portion of the cable 28. Among other elements, the rolloff switch includes a housing 60, at least two sensors 90, a retainer 100, an adapter 110, a magnet 120, and a coil spring 130. As explained below, the rolloff switch 50 is operable to disengage the cruise control device 22 in response to rotation of the handgrip 26 in the clockwise direction. The rolloff switch 50 has a neutral position (solid lines in FIG. 3), where the cruise control device 22 is not affected, and an activated position (dashed lines in FIG. 3), where the cruise control device 22 is disengaged.

Figure 3:
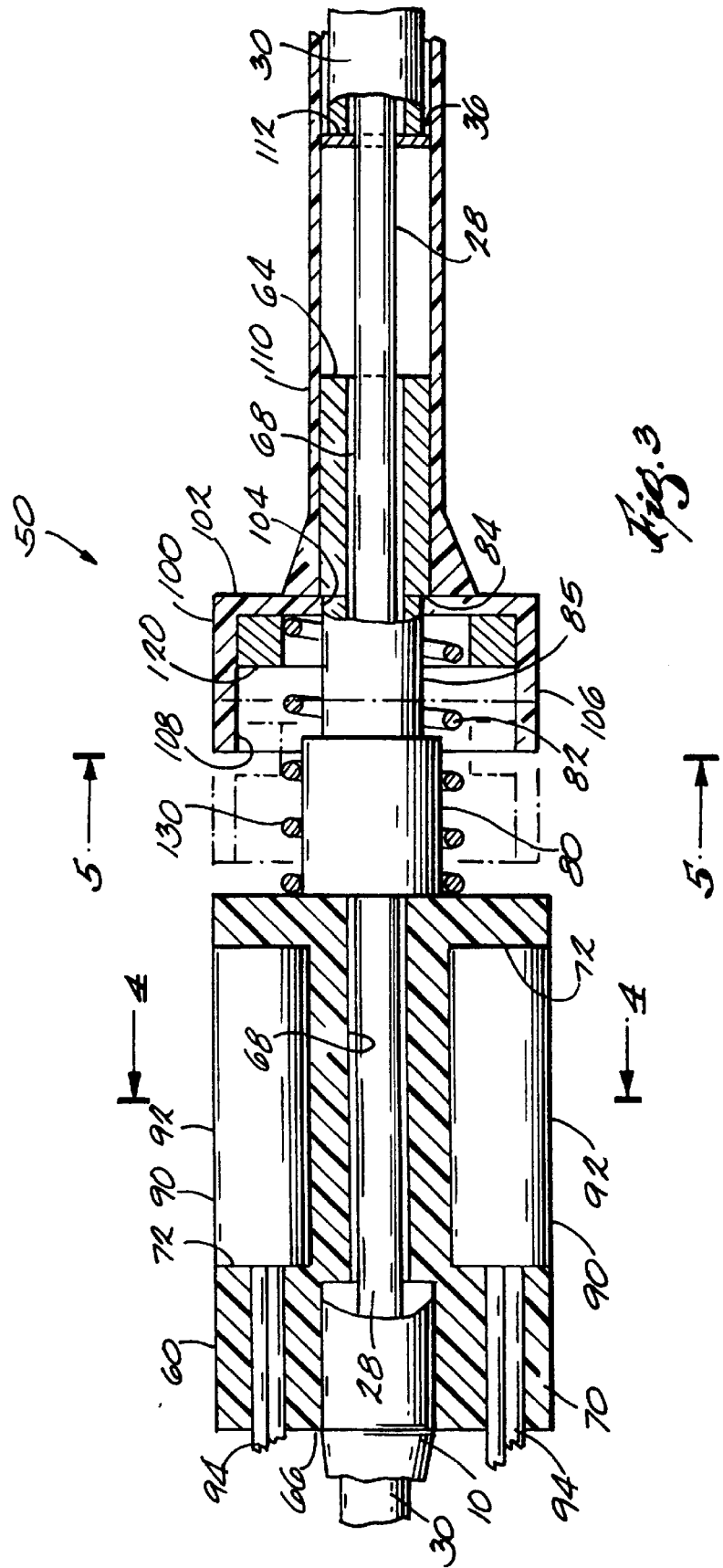
FIG. 3 is an expanded cross-sectional view of the throttle rolloff switch shown in FIG. 2.

Referring to FIGS. 3 and 4, the housing 60 has a central axis 62, a first end 64, and a second end 66. A passage 68 extends through the center of the housing 60 from the first end 64 to the second end 66. The passage 68 is aligned with the central axis 62. The housing 60 includes a cylindrical body 70 and a protruding portion 80. The body 70 has a pair of cavities 72 spaced apart on opposing sides of the central axis 62.

Each sensor 90 includes a body portion 92 and lead wires 94 connecting the body portion 92 to the cruise control device 22. Each body portion 92 is hermetically-sealed and is supported within a corresponding cavity 72 of the body 70. The lead wires 94 of each sensor 90 are connected to the cruise control device 22 connections 24 forming a parallel rolloff circuit (See FIG. 2). In a preferred embodiment, the sensors 90 are reed switches. The operation of a reed switch in response to a magnet is known in other fields. Therefore, the operation of the reed switch itself need not be described in great detail.

In the neutral position of the rolloff switch 50 (solid lines in FIG. 3), the switch of each sensor 90 is open. The switches close when the magnet 120 is within a set sensing distance from the sensors 90. In a preferred embodiment, the set sensing distance, the distance between the sensors 90 and the magnet 120 is between 0.100 inch and 1.000 inch and, most preferably, is approximately 0.425 inch.

The protruding portion 80 extends from the body 70. A first retainer stop 82 is formed on the protruding portion 80 near the body 70. The first retainer stop 82 has an annular engagement surface that is substantially perpendicular to the central axis 62. A second retainer stop 84 is formed on the protruding portion 80 near the first end 64 of the housing 60. The second retainer stop 84 has an annular engagement surface that is substantially perpendicular to the central axis 62. An intermediate portion 85 extends between the first retainer stop 82 and the second retainer stop 84.

Referring to FIGS. 3 and 5, the retainer 100 has a front wall 102 and an opening 104 that extends through the center of the front wall 102. The front wall 102 and the opening 104 are preferably circular. The retainer 100 also has an cylindrical side wall 106 extending from the front wall 102. The walls 102 and 106 of the retainer 100 define a recess 108.

As shown in FIG. 3, the hollow adapter 110 fits over the second retainer stop 84 and extends from the outer face of the retainer 100 to an adapter end 112 beyond the first end 64 of the housing 60. The adapter end 112 is adapted to receive the second end of the first conduit portion 32 and has a narrow opening through which the cable 28 fits. The adapter end 112 is crimped onto the conduit 30.

The magnet 120 is annular in shape and is positioned within the recess 108 so that the magnet 120 is not easily removable from the retainer 100. In a preferred embodiment, the magnet 120 is constructed of ceramic materials. Preferably, the opening in the magnet 100 is larger than the opening 104 in the front wall 102.

The intermediate portion 85 of the protruding portion 80 extends through the opening 104 in the retainer 100 and through opening in the magnet 120. The retainer 100 and magnet 120 are able to move along the intermediate portion 85 of the protruding portion 80. The first retainer stop 82 can engage the retainer 100 to stop movement of the retainer 100 towards the body 70. The second retainer stop 84 can engage the retainer 100 to prevent the retainer 100 from moving off the first end 64 of the housing 60.

The second end 36 of the first conduit portion 32 engages the adapter end 112. The first end 40 of the second conduit portion 38 engages the second end 66 of the housing 60 around the opening of the passage 68.

The spring 130 is supported on the protruding portion 80. An end of the spring 130 engages the inner face of the front wall 102 of the retainer 100 and fits within the opening in the magnet 120. The opposite end of the spring 130 engages an end surface of the body 70. The spring 130 biases the retainer 100 and the body 70 in separated relation so that, in the neutral position, the retainer 100 is biased against the second retainer stop 84.

In testing of the rolloff switch 50, it was determined that a single sensor 90 was insufficient. If the cable 28 and conduit 30 bend, the retainer 100 is moved towards the body 70 at a non-perpendicular angle relative to the body 70. When the retainer 100 engages the first retainer stop 82, a portion of the magnet 120, which would normally be sensed by the sensor 90, may be outside of the sensing distance of the sensor 90. If this occurs, the sensor 90 does not sense the magnet 120 and the rolloff circuit is not completed.

Additional sensors 90 positioned at angularly spaced locations in the body 70 (relative to the central axis 62) greatly reduce the likelihood of the rolloff circuit not being completed even if the retainer 100 is not perpendicular when it engages the first retainer stop 82. The preferred embodiment includes two sensors 90 to optimize the performance of the rolloff switch 50 while minimizing the cost of manufacturing the rolloff switch 50.

In operation, the operator drives the motorcycle 10 at a speed. In a known manner, the cruise control device 22 has been turned on and is maintaining the motorcycle 10 at a substantially constant speed. The rolloff switch 50 is in the neutral position.

When the operator wishes to decrease the speed of the motorcycle 10, the operator rotates the handgrip 26 in the clockwise direction. The rotation of the handgrip 26 places the cable 28 in tension and the conduit 30 under compression. The second end 36 of the first conduit portion 32 and the first end 40 of the second conduit portion 38 engage the retainer 100 and the housing 60, respectively, and move the retainer 100 and the body 70 closer together. The biasing force of the spring 130 is overcome by this compression. The retainer 100 moves towards the body 70 until it engages the first retainer stop 82. The magnet 120 is also moved towards the body 70. This is the activated position of the rolloff switch 50.

When the magnet 120 and the sensors 90 are within a certain distance of each other, the sensors 90 sense the magnet 120 and the switches close, completing the rolloff circuit. A signal is generated by the switches and transmitted to the cruise control device 22 to disengage the cruise control device 22. Once the cruise control device 22 is disengaged and the operator stops rotating the handgrip 26 in the clockwise direction, the tension within the cable 28 is removed and the rolloff switch 50 will return to the neutral position. Once the magnet 120 is outside of the set sensing distance of the sensors 90, the switches open and the signal ceases. Once the signal is stopped, the cruise control device 22 is no longer disengaged by the rolloff switch 50. The cruise control device 22 may then be re-engaged.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

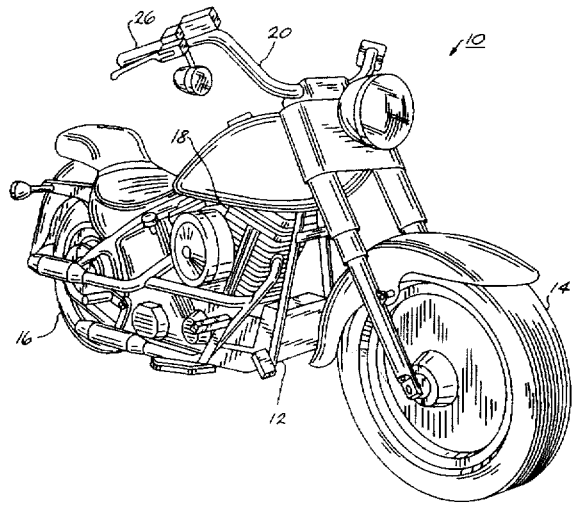

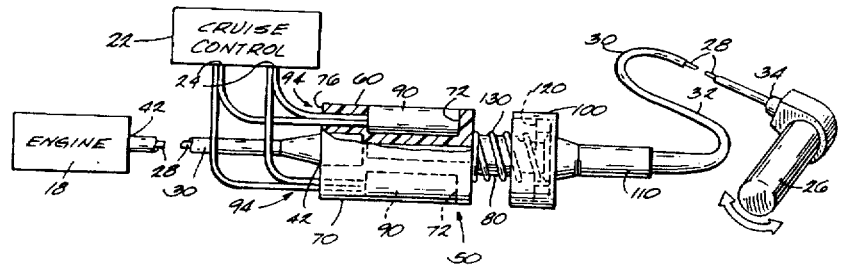

What is claimed is:

1. A motorcycle comprising:

an engine capable of operating at a speed;

a throttle control operatively associated with said engine, said throttle control movable in a first direction to increase the speed of said engine and in a second direction to decrease the speed of said engine;

a cruise control device operatively associated with said engine and capable of maintaining a speed of said motorcycle substantially constant; and a throttle rolloff switch operatively associated with said throttle control and said cruise control device to deactivate said cruise control device upon movement of said throttle control in the second direction, said rolloff switch including:

a magnetically-sensitive sensor; and a magnet positioned in spaced relation to said magnetically-sensitive sensor and movable relative to said magnetically-sensitive sensor, wherein movement of said throttle control in the second direction when said cruise control device is activated causes movement of said sensor relative to said magnet.

2. The motorcycle of claim 1, wherein said rolloff switch includes a coil spring positioned between said sensor and said magnet so that said sensor and said magnet are biased in separated relation.

3. The motorcycle of claim 1, wherein said throttle control includes:

a throttle cable movable in a first direction to increase the speed of said engine and in a second direction to decrease the speed of said engine, wherein movement of said throttle cable in the second direction when said cruise control device is activated creates tension in said throttle cable; and a conduit surrounding a portion of said cable and engaging said rolloff switch, wherein said conduit is under compression when said throttle cable is under tension to thereby move said magnet towards said sensor.

4. The motorcycle of claim 1, wherein said rolloff switch includes a plurality of magnetically-sensitive sensors.

5. The motorcycle of claim 4, wherein said sensors are reed switches.

6. The motorcycle of claim 4, wherein said rolloff switch includes a generally cylindrical housing having an axis, said housing surrounding said sensors and said housing maintaining said sensors in spaced relation on opposing sides of said axis.

7. The motorcycle of claim 1, wherein said rolloff switch includes a housing, and wherein said sensor is sealed within said housing.

8. The motorcycle of claim 1, wherein said rolloff switch includes an annular retainer defining a recess, and wherein said magnet is positioned within said recess.

9. The motorcycle of claim 8, wherein said magnet is annular.

* * * * *

UNITED STATES PATENT AND TRADEMARK OFFICE
CERTIFICATE OF CORRECTION

PATENT NO. : 5,881,833
DATED : Mar. 16, 1999
INVENTOR(S) : Branch et al.

It is certified that error appears in the above-identified patent and that said Letters Patent is hereby corrected as shown below:

The title page should be deleted to appear as per attached title page.

Signed and Sealed this

Twenty-eighth Day of March, 2000

Attest:

Q. TODD DICKINSON

Attesting Officer

Commissioner of Patents and Trademarks

United States Patent
Branch et al.

[11] Patent Number: 5,881,833
[45] Date of Patent: Mar. 16, 1999

[54] MOTORCYCLE THROTTLE ROLLOFF SWITCH

[75] Inventors: Matthew G. Branch, Hartford; Matthew F. Planning, Milwaukee, both of Wis.

[73] Assignee: Harley-Davidson Motor Company, Milwaukee, Wis.

[21] Appl. No.: 802,143

[22] Filed: Feb. 19, 1997

[51] Int. Cl.$^6$ ................................. B60K 31/00
[52] U.S. Cl. .................. 180/179; 180/219; 74/625
[58] Field of Search ........................ 180/179, 170, 180/178, 219; 74/625; 23/360, 350, 352, 378

[56] References Cited

U.S. PATENT DOCUMENTS

| | | | |
|---|---|---|---|
| 3,982,446 | 9/1976 | Van Dyken | 74/488 |
| 4,137,793 | 2/1979 | Sowell | 74/488 |
| 4,364,283 | 12/1982 | Ricardo | 74/489 |
| 4,513,836 | 4/1985 | Treadwell | 180/177 |
| 4,524,843 | 6/1985 | Class et al. | 180/179 |
| 4,569,239 | 2/1986 | Shirley et al. | 74/89 |
| 4,580,537 | 4/1986 | Uchiyama | 123/352 |
| 4,610,230 | 9/1986 | Saito et al. | 123/360 |
| 4,884,649 | 12/1989 | Onishi et al. | 180/179 |
| 4,969,531 | 11/1990 | Hirakata et al. | 180/179 |
| 5,319,557 | 6/1994 | Juman | 364/426 |

OTHER PUBLICATIONS

Clare, Reed Switch Specification.
Nascom, inc., Security Switches You Can Depend On.

*Primary Examiner*—Peter C. English
*Assistant Examiner*—Bridget Avery
*Attorney, Agent, or Firm*—Michael, Best & Friedrich LLP

[57] ABSTRACT

A motorcycle having a throttle rolloff switch that is operatively associated with the throttle control and the cruise control device to deactivate the cruise control device when the throttle control is rotated to reduce the speed of the motorcycle. The rolloff switch includes a magnetically-sensitive sensor, a magnet positioned in spaced relation to the sensor and movable relative to the sensor, and a coil spring positioned between the sensor and the magnet so that the sensor and the magnet are normally biased in separated relation.

9 Claims, 3 Drawing Sheets